US007004382B2

(12) United States Patent
Sandru

(10) Patent No.: US 7,004,382 B2
(45) Date of Patent: Feb. 28, 2006

(54) PAYMENT VALIDATION NETWORK

(76) Inventor: Calin A. Sandru, 26 Mistysugar Trail, Thornhill, Ontario (CA) L4J 8R5

( * ) Notice: Subject to any disclaimer, the term of this patent is extended or adjusted under 35 U.S.C. 154(b) by 26 days.

(21) Appl. No.: 10/631,735

(22) Filed: Aug. 1, 2003

(65) Prior Publication Data

US 2004/0089711 A1 May 13, 2004

Related U.S. Application Data

(60) Provisional application No. 60/400,035, filed on Aug. 2, 2002.

(51) Int. Cl.
*G06F 17/60* (2006.01)

(52) U.S. Cl. ............... 235/379; 235/380; 235/382; 235/375; 705/16; 705/17; 705/21; 705/35; 705/38; 705/43; 705/44; 705/45

(58) Field of Classification Search .......... 235/379, 235/380, 382, 375; 705/42, 35, 16, 38, 17, 705/21, 43–45
See application file for complete search history.

(56) References Cited

U.S. PATENT DOCUMENTS

| | | | | |
|---|---|---|---|---|
| 5,484,988 | A * | 1/1996 | Hills et al. | 235/379 |
| 6,189,785 | B1 * | 2/2001 | Lowery | 235/379 |
| 6,233,340 | B1 | 5/2001 | Sandru | |
| 6,325,292 | B1 * | 12/2001 | Sehr | 235/375 |
| 6,464,134 | B1 * | 10/2002 | Page | 235/379 |
| 6,470,322 | B1 * | 10/2002 | Walker et al. | 705/16 |
| 6,594,624 | B1 | 7/2003 | Curet | |
| 6,648,225 | B1 * | 11/2003 | Harris et al. | 235/454 |
| 6,757,664 | B1 * | 6/2004 | Cardinal et al. | 705/38 |
| 6,827,260 | B1 * | 12/2004 | Stoutenburg et al. | 235/380 |
| 6,853,988 | B1 * | 2/2005 | Dickinson et al. | 705/75 |
| 2002/0032656 | A1 * | 3/2002 | Chen | 705/43 |
| 2003/0050892 | A1 * | 3/2003 | Clynes et al. | 705/45 |
| 2003/0218061 | A1 * | 11/2003 | Filatov | 235/379 |
| 2004/0002878 | A1 * | 1/2004 | Maria Hinton | 705/7 |
| 2005/0021466 | A1 * | 1/2005 | Buchanan et al. | 705/42 |

\* cited by examiner

*Primary Examiner*—Jared J. Fureman
*Assistant Examiner*—Allyson N Trail
(74) *Attorney, Agent, or Firm*—TORYS LLP

(57) ABSTRACT

A payment validation network having network of payment validation cells, each of which includes: one or more local qualifier systems for assessing the risk of loss in accepting a check; a service finder for identifying the scope of coverage provided by each of the local qualifier systems and for identifying the scope of coverage provided by other cells; and one or more input/output (I/O) sources for obtaining transaction data associated with a check at a point of presentment. The request servicer interfaces with the I/O sources, service finder and the qualifier systems in order to (i) receive transaction data from an I/O source in connection with the check, including the routing/transit number, (ii) maintain a user profile for the I/O source, (iii) consult the service finder to identify which local qualifier systems cover the routing/transit (R/T) number associated with the check, (iv) transmit a payment validation request to the identified local qualifier systems and at least one other remote request servicer in accordance with the user profile, (v) receive one or more validation results from local qualifier systems or remote request servicers, and (vi) process said results to provide a homogeneous validation assessment to the requesting I/O source.

29 Claims, 11 Drawing Sheets

```
<ValidationRequest>
    <ImmediateCheckValidation>"ValidateTransaction"</ImmediateCheckValidation>
    <Level of Service Requested>
        <value>"Gold" </value>                  }67
    </Level of Service Requested>
    <Requestor_Identity>
        <TellerId>
            <value><i4>41</i4></value>          }66
        </TellerId>
        <RequestTime>
            <value><i4>9999</i4></value>
        </RequestTime>
        <RequestIntegrityCode>
            <value><i4>8765</i4></value>        }68
        </RequestIntegrityCode>
        <TransactionID>
            <value>"TIDA9s9DTcd8765"</value>
        </TransactionID>
    </Requestor_Identity>
    <Debit_Params>
        <DraweeRT>
            <value>"123456789"</value>
        </DraweeRT>
        <DebitAcct>
            <value>"112233445566"</value>
        </DebitAcct>
        <ItemNumber>
            <value>"100212"</value>
        </ItemNumber>
        <PayeeName>
            <value>"John Doe Jr."</value>       }62
        </PayeeName>
        <Amount>
            <value><i4>1234</i4></value>
        </Amount>
        <Check Image>                            <-- Optional    }64
            <Image format><TIFF></Image format>
            <value><binary set of values defining the image></value>
        </Check Image>
    </Debit_Params>
    <Credit_Params>
        <BankOfFirstDepositRT>
            <value>"987654321"</value>
        </BankOfFirstDepositRT>
        <DepositAcct>
            <value>"665544332211"</value>
        </DepositAcct>
        <DepositAccountVelocity>
            <value><i4>78</i4></value>
        </DepositAccountVelocity>
    </Credit_Params>
</ValidationRequest>
```

PAYMENT VALIDATION NETWORK

CROSS-REFERENCE TO ANOTHER APPLICATION

This application claims priority from U.S. Provisional Patent Application No. 60/400,035 filed Aug. 2, 2002, the contents of which application are incorporated herein by reference.

FIELD OF THE INVENTION

The invention generally relates to the field of electronic transaction systems and more particularly to payment validation or authorization systems and related methods for performing transaction validation, especially for checks, at a point of presentment.

BACKGROUND OF INVENTION

Checks are a pervasive non-cash form of payment. For example, it is estimated that over 60% of American households use one or more checks to pay for retail purchases. Despite the significant convenience checks provide customers, accepting checks can expose merchants and other payees to the risk that a check may be fraudulent in which case the check may not be honored by the bank of first deposit or the payor's bank. The payor's bank may also not honor checks for a variety of other reasons including the fact that the account is closed or there are insufficient funds in the account. In many cases where a check is bad, the payee (and merchants in particular) find it difficult, if not impossible, to collect payment.

It is desirable to have a payment validation system that will enable merchants to reject as many bad checks as possible while also rejecting as few good checks as possible. Due to the nature of retail environment, merchants must make a quick and accurate decision whether to accept or reject a check, prior to completing a transaction. Thus, the decision should be made at the point of presentment. This decision is also necessary when sales occur over the Internet and the form of payment is a check.

Similarly, when a check is deposited at a financial institution it is desirable for the financial institution to be able to determine, at the point of presentment, if the check will be returned or the transaction can be completed without risk of loss. One of the problems with existing check clearance processes is that there is a significant delay between the time a check is first deposited at the presenting bank and the time the payor's bank accepts or rejects the check. Typically, the presenting bank either places a hold on the depositor's bank account until the presenting bank receives confirmation of payment transfer (from the payor bank) or the presenting bank pays out the money to the depositor (presenter) and assumes the risk that the check will be rejected by the payor bank as an unpaid check.

Either way, checks are sent to the payor bank, either physically, or as part of a check truncation process in which payment data is processed, or as part of an electronic check presentment (ECP). Upon presentment, the payor bank processes the checks to debit the affected payor's account. During this process conditions such as insufficient funds, closed accounts, uncollected balances, stop payment orders and other irregularities may occur that will not allow the check to be debited to the payor's account. Each such exception typically requires review by a bank officer to determine whether the check should be paid or whether the check should be returned to the presenting bank that submitted the check for payment. If the check is returned, it is physically (or in the case of ECP, electronically) sent back to the presenting bank and a decision is made by an officer thereof to either re-present the check to the payor bank by reinitiating the entire clearing process in the hope that sufficient funds are then available to pay the check or to notify the depositor that the check was unpaid and is to be returned to the depositor, with the depositor's account being debited for the unpaid check as a charge back. This decision process is typically a manual process that requires the bank officer to examine the check and, in the majority of cases, to review prior instructions provided by the depositor to determine the appropriate disposition of the returned check.

It is further possible that during this process, the presenting bank will be out-of-pocket for the amount of the deposited check, if it elected to pay out cash for the check. More elaborate fraud schemes are check kiting, which take advantage of this situation.

One significant problem in assessing the risk of accepting a payment made by check, either by a merchant, at a bank teller line or through an ATM machine is the availability of relevant information, in real time, accurately. The procedures and processes for clearing checks generally differ from one bank to another because not all banks clear their checks directly. Some may outsource their check clearing and reconciliation function to outside service providers. In addition, there is a three hour time difference between East coast banks and West coast banks, which creates a gap in updating and/or obtaining accurate transaction status, account balances, etc.

Accordingly, there is a need for real time, on-demand, check validation that can be broadly applied by a wide variety of participants including merchants, banks, and other financial institutions which process checks in batch.

The prior art has attempted to deal with these problems, albeit in a non-comprehensive manner. For example, U.S. Pat. No. 6,189,785 to Lowery discloses a demand deposit account data processing system that allows merchants to settle transactions on line and in real time and that automatically processes transactions in a number of exception conditions. The system comprises demand deposit account data that originate from a data source (such as a payor bank). The system requires at least one point of sale terminal that is specially adapted to receive that data in order to initiate a transaction. A central computer system interconnects the data source and the point of sale terminal. The data source provides some validation capability based on the availability of one or more databases, including a positive database, a negative database, a velocity/risk database, a closed account database, and an exception database. The central computer system communicates with the data source to settle the transaction on line or through conventional automated clearinghouse channels. The system also preferably automatically updates all of its databases with pertinent transaction information once a transaction result is obtained.

The Lowery system has some significant limitations. For example, it requires and depends on an integrated point of sale terminal, with data storage and specific, dedicated algorithms designed only for physical merchants. The system thus cannot handle other types of entities or institutions that may wish to validate a check or debit payment. Moreover, the system requires payor banks to upload customer account information to the central computer system. In addition to the fact that this requires a change in bank procedures, it also destroys the confidentiality of this information. Furthermore, as a result of the different time zones in the check clearing process and the fact that the system requires payor banks to upload their files, the information is never up-to date. In addition, the system does not describe how the point of sale terminal is updated with various sets of data, and cannot take into account various scenarios such as a course of action based on authorization results. Another disadvantage of this system is that it relies either on a continuous update of purchase and approval information into the negative/positive databases which are an input into the authorization process—in which case there is no suggestion on how the system should handle reversed transactions, or it settles transactions via the once-a-day ACH process—in which case there is a significant limitation in updating account status (and availability of funds) back into the central processing system.

It would be most desirable to provide a payment validation system that can support a wide variety of users, including merchants and banks. It would also be useful to have such a payment validation system that employs legacy systems, but in such a way as to maintain the confidentiality of proprietary information, such as banking information, which may be used to authorize a payment transaction. Furthermore, it is desirable to increase the accuracy of the validation in an economically efficient manner.

SUMMARY OF THE INVENTION

According to one aspect of the invention, a check validation system is provided which comprises a network of validation cells. Each cell is associated with at least one local qualifier system for assessing risk of loss in accepting a check. An input/output (I/O) source is operatively connected to at least one cell for obtaining transaction data associated with a check at a point of presentment. The system enables a given validation cell that is operatively connected to a requesting I/O source to receive transaction data therefrom in connection with a given check and forward a payment validation request to at least one other cell for obtaining at least one validation result from at least one remote qualifier system associated with the at least one other cell. The given cell transmits at least one validation assessment back to the requesting I/O source based on the at least one validation result.

The qualifier systems preferably employ disparate methods for assessing the risk of loss in accepting a check. For example, a qualifier system can be a core banking system, an issued items database system, a merchant check authorization system, a risk-based statistical modeling system, a check printing system, a check authentication system, a signature verification system, a visual analysis system, or a credit authorization system. Preferably, the given cell receives validation results from a plurality of disparate qualifier systems and processes the results to provide a homogeneous validation assessment to the requesting I/O source. In the preferred embodiment, the homogeneous validation assessment is expressed as: (i) the likelihood that the check is properly issued and (ii) the likelihood of the check clearing.

In the preferred embodiment, either the requesting I/O device or the given cell (e.g., as a proxy therefor) formats the payment validation request according to a common network protocol based on the transaction data, prior to sending the payment validation request to the at least one other cell. Similarly, either the local qualifier system or the cell (e.g., as a proxy therefor) formats the validation result(s) according to a common network protocol. This enables cells to propagate payment validation requests to various qualifier systems without foreknowledge of the capabilities or native data formats of the qualifier systems and enables the qualifier systems to operate on any payment validation request made by any I/O source.

A cell preferably forwards a payment validation request to its local qualifier systems based on routing/transit (R/T) information included in the transaction data. Each cell preferably maintains user profiles for determining if a payment validation request received from the requesting I/O device should be forwarded to other cells for obtaining validation results therefrom. A cell may forward the payment validation request to other cells in the event the local qualifier systems do not cover the R/T number of the check. Alternatively, the user profile may include a quality of service indicator, and the given cell may forward a payment validation request associated with a specified user to at least one other cell if the local qualifier systems do not provide the quality of service indicated for the specified user.

The distributed nature of the payment validation network eliminates the need to centralize information pertaining to the validity of a check, and thus provides a better analysis from a number of perspectives, including temporal, geographical, and economic aspects. First, the validation analysis occurs at the data source in substantially real time and so eliminates the delay in data uploads—a critical factor in reducing check fraud. Second, the distributed nature of the qualifier systems enables a wide geographical area and hence a greater scope of checks to be covered by the system. Third, the system enables a wide variety of qualifier systems to be involved in assessing check validity, and in addition, enables new qualifier systems to dynamically come on line. Consequently, obtaining additional information where necessary can reduce risk due to uncertainty. Moreover, the common network protocol enables data sources to maintain the confidentiality of sensitive information.

In the preferred embodiment, each validation cell is associated with: a plurality of qualifier systems for assessing the risk of loss in accepting a check; a service finder for identifying the scope of coverage provided by each of the qualifier systems; a plurality of input/output (I/O) sources for obtaining transaction data associated with a check at a point of presentment; and a request servicer interfacing with the I/O sources, service finder and the qualifier systems. The request servicer is preferably programmed to: (i) receive transaction data from an I/O source in connection with the check, including the routing/transit number, (ii) consult the service finder to identify which qualifier system covers the check, (iii) transmit a payment validation request to the identified qualifier systems, (iv) receive one or more validation results from identified qualifier systems, and (v) process said results to provide a homogeneous validation assessment to the requesting I/O source.

According to another aspect of the invention a check validation system is provided which includes a plurality of qualifier systems that employ disparate methods for assessing the risk of loss in accepting a check. A request servicer communicates with at least one input/output (I/O) source for obtaining transaction data associated with the check at a point of presentment and for communicating a check payment validation request from the at least one I/O source to at least two of the disparate qualifier systems. The check payment request is formatted according to a common network protocol by either the at least one I/O source or the service requester. The service requester is programmed to receive a validation result from each of the disparate qualifier systems and either the service requester or the at least one I/O source process the results to provide a combined validation result to a requesting I/O device.

In the preferred embodiment, the I/O source may be a web site which is configured to interface with a variety of I/O devices. This enables the system to interact with a variety of legacy I/O devices deployed by a variety of participants such as individuals, merchants, and banks functioning in various capacities.

BRIEF DESCRIPTION OF DRAWINGS

The foregoing and other aspects of the invention will be understood and appreciated more fully from the following detailed description taken in conjunction with the following drawings, in which:

FIG. 3 exemplifies the text composing a payment validation request made to the payment validation network;

FIGS. 7–9 are diagrams of web pages incorporated into the web site of the preferred embodiment.

DETAILED DESCRIPTION OF PREFERRED EMBODIMENTS

Figure 1:
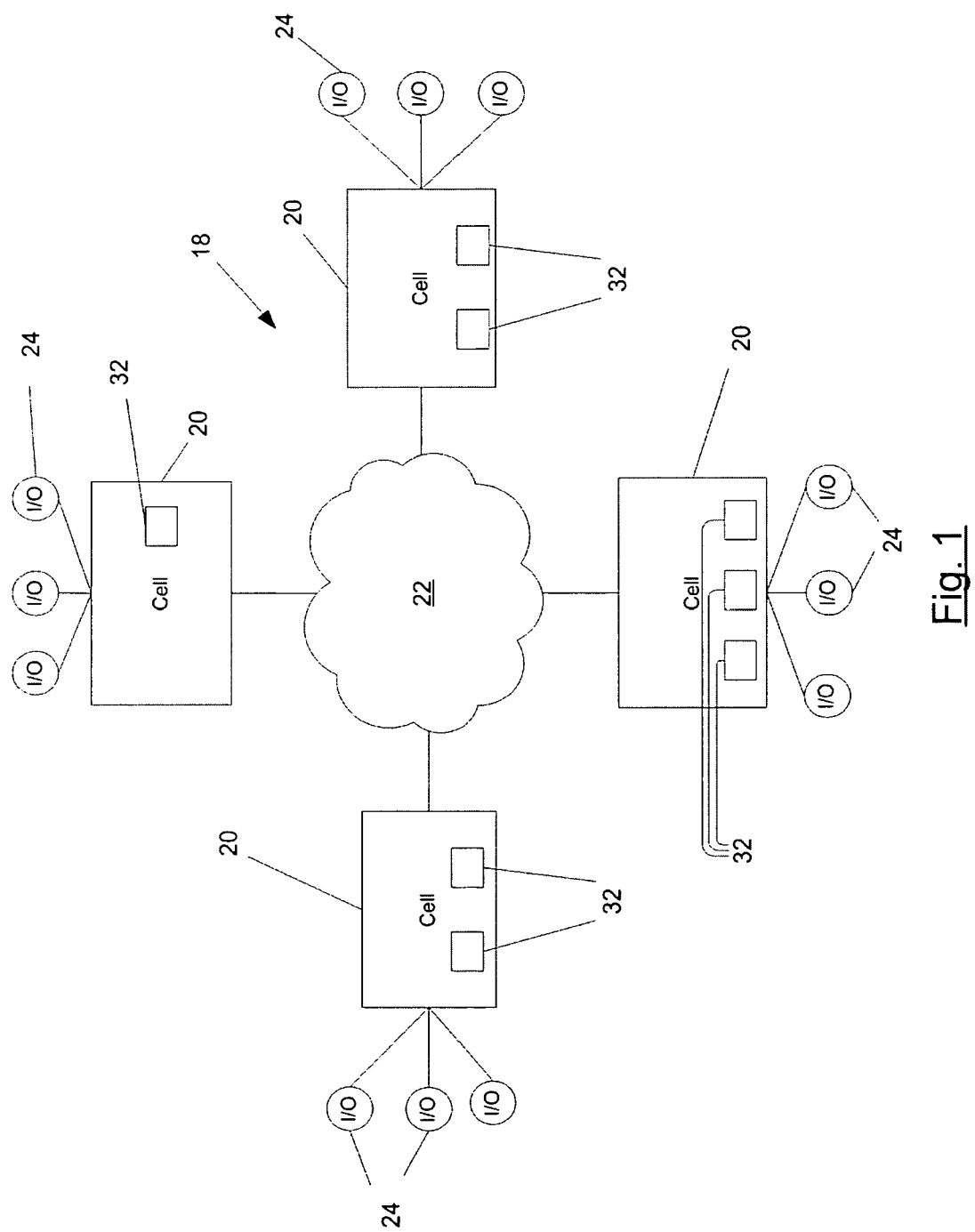
FIG. 1 is a schematic diagram of a payment validation network according to the invention.

In the following description, the following terms are defined as follows:

"Homogenous validation assessment"—a normalized estimation of the risk of loss in accepting a check, based on the results of one or more transaction validation processes. In the preferred embodiment, this normalized estimation is expressed in two dimensions: (i) the probability that the check is properly issued, e.g., that the check document is authentic, not forged or counterfeit, and/or that the information conveyed by that document is not forged, counterfeit, altered or otherwise used without authorization; and (ii) the likelihood of the check clearing the settlement process. The estimation in any dimension depends in part on the character of the validation result(s) that go into assessing the value of the dimension—precise or determinative validation results will typically be weighted higher than non-precise or indeterminate validation results.

"Payment data"—generally refers to payment instructions present on the face of a check, and includes:
the name of the payor;
the value of the payment;
the account number that the payment is drawn from;
the identity of the payor bank, by name and routing-transit (R/T) number;
the payee identified by name in the "Pay to" information on the check; and
the serial number, date of issue, and other identification information printed on the face of the check.

Payment data can include the image of a payment instrument, where the semantic data can be extracted form a series of bits and pixels.

"Payment transaction validation" or "transaction validation" is a process wherein information in addition to payment data is used to assess the risk of loss in accepting a check. The loss may be suffered by the entity accepting the check, such as by a merchant, e.g., if the payor account has insufficient funds; by the presenting bank, e.g., in the case of a deposited check which is forged; or by the payor bank (or ultimate account owner), e.g., where use of the check is unauthorized.

"Payment validation request"—generally speaking, a request which initiates a payment transaction validation.

"Payor"—the person, company or organization whose bank account will be debited when a check is presented and cleared.

"Payor bank"—alternatively referred to as "drawee", is the bank holding an account on behalf of a payor.

"Point of presentment"—the point at which a requestor desires to conduct a transaction validation. The presentment point can be at a merchant site, prior to the merchant accepting a check; at a bank teller line, prior to accepting a check for deposit; or at a clearance center, when checks are processed in batch.

"Presenting bank"—alternatively referred to as "bank of first deposit" or "payee's bank", is the bank at which a negotiable instrument is presented for payment. An example of a transaction using a check (alternatively referred to as an "item") is when a first party receives a check from a second party. The bank that the check is drawn on is the payor bank. The first party deposits the check at its bank, known as the presenting bank. In order for the presenting bank to collect on the check presented by the customer, the bank "presents" the check to the payor bank for deduction from the account of the payor bank customer who wrote the check—the second party. When the payor bank receives the check and processes the transaction, it essentially credits the presenting bank through a settlement process. Additionally, in terms of the delivery of items presented to the payor bank by a presenting bank for payment, the payor bank is sometimes referred to as the "destination" bank.

"Transaction Data"—the data associated with a transaction between a presenting bank and a customer depositing a check, or a transaction between a merchant and a customer paying for goods. Transaction data comprises payment data, and also includes various other types of data such as depositor identification data, merchant data, general data, and security data. Depositor identification data includes the presenting bank R/T number, depositor's account, and potentially teller identification if the check is a deposit made at the teller line. Merchant data includes a merchant identification such as login name, name, store, etc. General or miscellaneous data includes data such as the date, time of day, day of week, physical location of transaction. Security data includes information used to ascertain if the check is forged or if the payment data conveyed thereby is forged, altered or otherwise unauthorized. This can include image information such as the signature on the check, check borders, and handwriting styles.

"Validator"—is an entity that provides a method or system for carrying out transaction validation.

"Validation requester" or "requester"—an entity which needs to confirm the risk or validity of a payment or deposit. A requester can be a physical merchant validating a payment on-demand before it exchanges goods; an electronic merchant validating payments in batch before shipping goods to multiple purchasers, for example at the end of a day; a teller at a presenting bank in real time when a customer deposits a check or exchanges the check for cash or other negotiable instruments; or by the presenting bank, in the clearing center, at the time it processes all POD (proof of deposit) runs, or at the end of the day, in batch.

"Validation result"—data provided as a result of a payment transaction validation. Validation techniques can be classified in two categories based on the results provided thereby: (i) precise or determinative methods, and (ii) indeterminate methods. Precise or determinative methods yield an absolute positive or negative result, for example, based on the payor's account status (open or closed), stop payments on a particular item (existing or not), availability of funds, or the presence (or lack thereof of an item in a file of issued items supplied to the payor bank by the item issuer. Indeterminate methods are typically based on risk scoring algorithms, which employ statistical based techniques. For example, a risk-based determination can rely on depositor or issuer profiles such as account velocity, if the check number is in the range of expected items, or if the payment amount is in the range of amounts usually being deposited and/or withdrawn, to render a score within a range of values. Other examples of risk based determinations include the check image, to determine if the signature of the presented check is generally acceptable as compared to known signatures of the payor, or comparing direct image features such as borders, text fonts and style, background, etc. against known image features used as reference, or comparing information inferred from or derived from the check image such as how a payor usually enters the date, the memo line, the dollar symbol, etc. and compare the derived information against prior known information.

FIG. 1 shows a distributed payment validation system 18 according to one embodiment of the invention which includes a network of validation cells 20, the structure of each of which is discussed in greater detail below. The validation cells 20 are preferably interconnected via a communications network 22 which may comprise the Internet, the public switched telephone network, dedicated telecommunication lines, or a mixture of same, as known in the art per se. Preferably, the validation cells communicate via a secure virtual private network as known in the art per se. It will be understood, however, that the particular communication means employed by the system 18 is not overly important provided that latency and throughput requirements as well as security requirements are satisfied for any given implementation of the system as will be understood by those skilled in the art.

One or more input/output (I/O) sources 24 are connected to at least some of the validation cells 20. The system 18 contemplates a variety of I/O sources 24 which may communicate with the validation cells using a variety of communication lines and/or communication protocols. In particular, the system contemplates the use of legacy banking and payment transaction processing equipment with a minimal need to introduce new infrastructure. For example, the validation cells 20 are preferably provided by legacy computer systems utilized by banks and other financial institutions, and the I/O sources 24 may be existing bank teller stations, point of sale terminals, or personal computers. It should also be noted that in some cases a given validation cell may also provide I/O capability or play a dual role as an I/O source.

Generally speaking, the system 18 enables a variety of entities to submit a payment validation request to the validation network using the I/O sources. As described in greater detail below, each cell 20 that receives a payment validation request can process the request using one or more local validation systems 32 (alternatively referred to as a "qualifier" system) which may perform different types of transaction validation or otherwise provide some information about the transaction data-set. In addition, each cell can propagate the payment validation request to one or more other cells for performing transaction validations. The request and the ensuing validation result(s) are preferably communicated across the network through the use of a common protocol. When an initiating cell receives multiple validation results pertaining to a transaction data set from multiple various qualifier systems, the cell preferably combines the multiple validation results in order to provide a homogeneous validation assessment, which is formatted for display or use on the I/O sources in accordance with the characteristics of the requester.

The system 18 thus enables various requestors to use the same infrastructure, even though the requesters may operate in wholly different contexts. For example, entities that can initiate a payment validation request include, but are not limited to, individuals, merchants, (including 'brick and mortar' and electronic merchants), bank tellers, and bank clearing centers.

Furthermore, the system also enables various validators to participate in analyzing the risk of accepting a check, even though the validators may operate in completely different contexts and employ very different types of validation techniques. For example, validators can include the payor's bank, the presenting bank, merchant transaction authorization organizations, positive pay organizations, and check printing or check authentication organizations, as discussed in greater detail below. Since the system 18 can carry out multiple transaction validations for the same transaction data-set using disparate qualifier systems, the accuracy of the validation can be improved for any given required quality of service. Moreover, the distributed nature of the network provides a greater scope of coverage, both geographically and in the number of accounts than can be handled, and in a more economical fashion, than any centralized authorization system.

Figure 2:
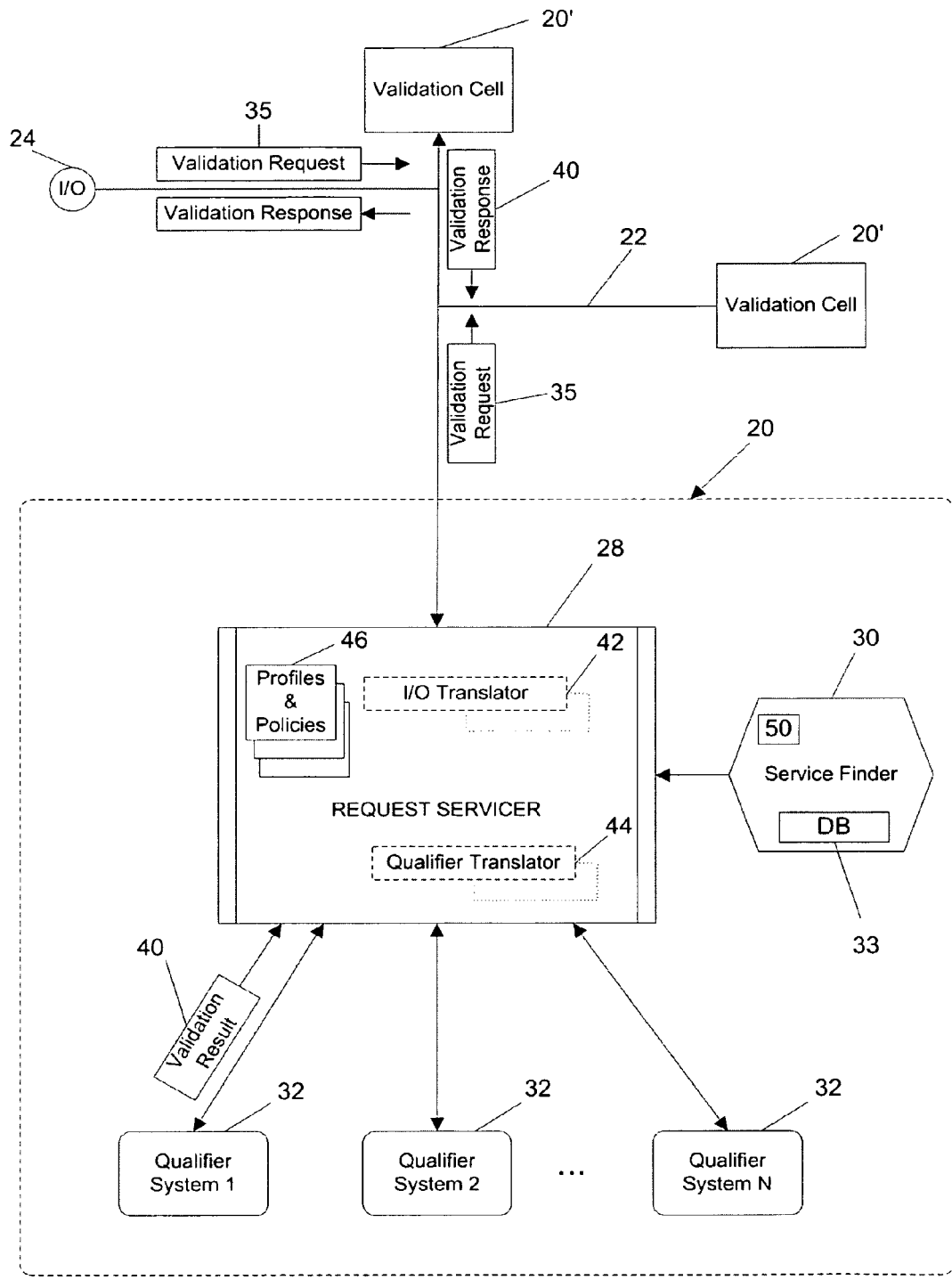
FIG. 2 is a schematic diagram illustrating the software architecture of a payment validation cell according to the preferred embodiment.

FIG. 2 shows the structure of a validation cell 20 in greater detail and its connections to various external components. In the preferred embodiment, each validation cell 20 includes a request servicer 28, a service finder 30, and one or more "local" qualifier systems 32. Generally speaking, the request servicer 28 forwards payment validation request 35 to the local qualifier systems 32 or other cells 20, and receives, processes and formats validation results 40 received from the local qualifier systems 32 and/or other validation cells 20'. The service finder 28 preferably indicates the scope, range or type of checks that each local qualifier system 32 and/or other cells 20' are capable of processing, and the local qualifier systems provide transaction validation.

More particularly, each qualifier system 32 is an independent validation system capable of providing some sort of transaction validation and providing some sort of validation result, which may be determinative or non-determinative. Each qualifier system 32 can be a legacy system, including a core banking system, an issued items database system, a merchant check authorization system, a risk-based statistical modeling system, a check printing system, a check authentication system, a signature verification system, a visual analysis system, or a credit authorization system. These are discussed in greater detail below.

Core banking systems typically characterize account status. For example, the payor's banking system can provide information about: the standing of the payor's account, i.e., open or closed account; the available balance; the existence of any stop payment instructions, or, if there is any other condition specific to the check clearing process that might prevent a check from being properly payable, or a payment from completing; and if the payor's account has sufficient funds to cover the face value of the check. Such information can be determined, for example, by searching a database of accounts based on the payor's account number, which is supplied as part of the transaction data. Similarly, the core banking system of the presenting bank (alternatively referred to as the "bank of first deposit") can provide information about the standing of the account to be deposited, the velocity of the account to be deposited, and any other condition specific to the check clearing process that might prevent a check from being properly payable, or a deposit from completing.

Merchant check authorization systems typically provide statistical-based determinations of risk of loss in accepting a check. The organizations providing such services typically insure merchants for the payment value of a check (usually up to a specific limit) provided the merchants obtain authorization from the organization prior to accepting the check. A set fee or portion of the payment is usually paid to the insuring organization for assuming the risk of non-payment. These organizations typically have historical transaction databases that record positive and negative experiences, and thus can provide a risk-based determination of the likelihood of a successful payment.

Issued items database systems are typically employed in "positive pay" schemes. These systems keep a list of all items issued and cashed and thus a query to such a system based on the serial number of the check involved in a transaction can determine whether or not the check was indeed authorizedly issued and is still outstanding. The positive pay organization can be a bank customer that issues checks or other payments, for itself or on behalf of other customers. Alternatively, a plurality of bank customers can upload their issued items file to a bank that maintains a collective issued items database.

Check printing systems are typically provided by check printing companies. Such systems can provide information of whether or not a check with a certain serial number was printed for a particular payor, and when. Check printing systems can also be provided directly by check issuing organizations such as corporations and governments which print checks on the fly, using blank stock. In this respect, such check printing systems resemble scaled down versions of positive pay systems.

Risk-based statistical modeling systems analyze a plurality of relevant variables, including payment and transaction data, in order to determine the probability of a particular check being good or bad, and in order to determine if a deposit or payment is within acceptable risk parameters. These systems are often employed by banks or merchant transaction authorization organizations. For each check presented, the system is typically capable of individually rating a check relative to all other checks that have been evaluated, either on the payor's account, or within a group or transactions. For each check presented, the system is typically capable of individually rating the deposit relative to other deposits into the same account, or within the same account group.

Check authorization systems attempt to verify the authenticity of a check based on certain indicia. One example of such a system is the SAND™ (Self-Authenticated Negotiable Document) system provided by Advanced Software Design Corporation of Richmond Hill, ON. The system reads a first encryption code and selected negotiable information from the check, identifies a key associated with the check issuer and then authenticates the check either by: (a) using the key to decrypt the encryption code and comparing the decrypted negotiable information with the negotiable information read from the check, rejecting the item if the comparison fails; or (b) using the key to encrypt the negotiable information read from the check in order to compute a second encryption code and comparing the first control code against the second control code, rejecting the item if comparison fails; or (c) using the key to authenticate a digital signature represented by the first encryption code against the negotiable information read from the check. The SAND™ system is described in part in U.S. Pat. Nos. 6,594,624 and 6,233,340, which are incorporated by reference herein.

Signature verification systems typically use the image of the presented check to compare a vector of values directly associated with a graphical representation of the signature, or derived/inferred from the graphical representation of the signature against a similar set of values known to be legitimate, to ascertain the probability of a check being genuine. Such comparison systems can be unsupervised, i.e., decided only by machine or may be supervised, i.e., subject to review by humans in addition to or instead of machine analysis.

Visual analysis systems typically compare the entire check image against known styles. For example, one such system compares a vector of values directly associated to the image of the check, or derived/inferred from the graphical image of the check against know similar type of values, where the values could include borders, colors, fonts, styles and positions that combined describe a document, modes of entering the date, and the format of the check date, existence and general style of the memo line, and other such parameters, to thereby determine the probability of a check being genuine. See, for example, U.S. Pat. No. 6,233,340. Such systems can be supervised or unsupervised.

Credit authorization systems provide information about the risk of accepting a credit card transaction. Such systems are typically run by credit card issuers and often link or associate bank accounts or payor names with credit cards. These systems are potentially able to provide information regarding any fraudulent activity that may have previously transpired.

Each qualifier system 32 provides an independent validation result. Qualifier systems are not aware of the existence of other qualifier systems and thus the validation result provided by any given qualifier system is not predicated on the results provided by other qualifier systems.

The service finder 30 includes a database 32 for storing information indicating the scope of checks that can be processed by the local qualifier systems, preferably based on check routing/transit numbers. The service finder 30 also indicates other validation cells 20' that a payment validation request could be sent to for processing, as discussed in greater detail below.

The request servicer 28 is preferably a software component executing on a legacy hardware platform or computer system. The request servicer may physically execute on the same hardware platform as one of the qualifier systems, e.g., a core banking system, or on a different hardware platform. The request server 28 has at least one interface to the service finder 28, at least one interface to at least one qualifier system 32, and at least one interface to another validation cell 20' via its service requester. Each such interface is preferably bi-directional. Communications between the request servicer and the local qualifier systems, between the request servicer and the service finder, and between multiple request servicers can take place through a computer memory, through a local area network, through a wide area network, over dedicated lines or public lines with secure channels. In the preferred embodiment, secure communication links are established between any two points, and between any two systems, although they may not be always necessary. Secure communication links can include secure sockets, virtual private networks, symmetric encryption and other well-known methods, which would enable various validation cells to communicate over public networks, including the world wide web.

The request servicer 28 includes logic for:

(i) identifying the origin, nature and source of a payment validation request;

(ii) transmitting the request to appropriate local qualifier systems or propagating the request to other cells;

(iii) receiving validation results from local qualifier systems or other cells corresponding to the same request;

(iv) interpreting and combining the validation results corresponding to the same request;

(v) building and formatting a homogenous validation assessment based on the validation results and formatting a response based on the origin, nature and source of the request, and (vi) transmitting the response to the I/O device requesting the validation.

As previously noted, the service requester 28 can receive a payment validation request 35 directly from the originating I/O source 24 or the request can arrive indirectly from another cell. If the request 35 arrives indirectly from another initiating cell, then the origin, nature and source of the request 35 is preferably explicitly identified through the use of the common network protocol, discussed in greater detail below. If the request is received directly from the originating I/O source 24, then the request may or may not be formatted to the common network protocol. If the I/O source is network-enabled, the request will be properly formatted whereby the origin and nature of the request should be identified in the request. If the I/O source is not network-enabled, the request received by the request servicer 28 will not be properly formatted to the common system protocol. In this case, the service requestor 28 preferably includes one or more I/O translators 42 specifically designed for bi-directionally communicating between the I/O sources in their native data format and the network.

Upon receiving a payment validation request 35, the service requester 28 consults the service finder 30 to determine if the local qualifier systems 32 are capable of processing the request based on the routing/transit number in the transaction data set. If so, then the request is dispatched to the appropriate local qualifier systems. In the most preferred embodiment, the local qualifier systems dynamically register with the service finder 30, by indicating their credentials and scope of coverage. It is therefore conceivable that multiple qualifying systems with the same scope and performing the same type of validation can register with the same service finder within a cell, in which case the service finder can implement logic for dynamically selecting amongst qualifier systems, to thereby function as a load balancing and hot standby system.

Communication between the request servicer and the local qualifier system can be synchronous (wherein one request for validation from the request servicer is immediately followed by a validation response from the qualifier system) or asynchronous (wherein the request servicer can submit several requests for validation without waiting for a response from the qualifier system). The local qualifier systems will typically utilize only a subset of the information in the transaction data set, depending on the legacy input data requirements of the local qualifier system. A local qualifier system may be network-enabled, in which case it will be capable of communicating with the service requester 28 using the network protocol. In the event that the local qualifier system is not network-enabled, the service requester 28 includes a translator 44 for each such local qualifier system in order to bi-directionally convert its native data format to and from the network protocol. Preferably, each qualifier system (or, if not network enabled, the service requester via translator 44) specifies the identity of the qualifier system in each validation result, such as the type of system (e.g., determinative or non-determinative), version and capability, as discussed in greater detail below.

The service requester may also forward a payment validation request 35 to another cell. This may occur, for example, when the cell originates a request (i.e., the request is received directly from an I/O source connected to the cell). In this case, the service requestor 28 preferably includes a profile 46 for each requester entity that has policy rules which dictate if and when the request should be forwarded or propagated to other validation cells. For example, the request could always be forwarded to other cells, forwarded only if the local qualifier systems are unable to process the request, or if the validation results from the local qualifier systems do not meet a predefined quality of service threshold, as discussed in greater detail below.

Alternatively, the service requester 28 may receive a payment validation request 35 initiated by another cell, in which case the decision as to whether or not to propagate the payment validation request will depend on the logic embedded in the service finder 30. The service finder, which indicates one or more other validation cells that the request could be sent to, can function using a variety of methods. One method is based on a connection-oriented technique in which the route the request travels is pre-provisioned or dynamically provisioned. For example, the service finder could have a local copy 50 of a master database (or have part of a distributed database) which indicates the scope of checks each cell 20 is capable of processing, the scope being preferably based on check routing/transit numbers. This database 50 would be updated every time a new cell is added to a network or new capacity is added to a cell. Using this approach, the service requester of an originating cell could concurrently propagate a payment validation request to multiple other cells, or a request could be forwarded to another cell with a route list indicating other cells to which the request should be forwarded. At the end of the process, a plurality of network-enabled validation results is encapsulated or otherwise included in the response back to the originating cell.

Another method is based on a connectionless technique in which the route the payment validation request travels is dynamically selected without any foreknowledge of which other cells are capable of processing the request. In this case the service requester functions as load balancer, e.g., using a round robin algorithm or a more sophisticated adaptive technique based on past results, to forward the request to one or more additional cells. Preferably, the originating cell formats the payment validation request with a traversal limit indicating the maximum depth of penetration into the network and each cell propagating the request incorporates its validation results in the request or otherwise indicates the fact that it has acted on the request, thus preventing circular traversals. At the end of the process, a plurality of validation results is included in one or more responses back to the originating cell.

The system 18 may also employ a combination of the connection-orientated and connectionless methods for routing a payment validation request across the network. For example, some cells could be organized in a hierarchy where the service finders thereof point to other cells in the hierarchy. In this manner, any payment validation request reaching a cell of the hierarchy could be forced to traverse the hierarchy. This would be useful, for example, where one organization has multiple validation systems that could be actuated to process a payment validation request.

In an originating cell, the request servicer 28 processes the validation results from local and remote qualifier systems to provide a homogenous validation assessment which is preferably expressed in two dimensions: (i) the probability of an item being properly issued, and (ii) the probability of an item being cleared by the payor bank. Each dimension is preferably represented as a score or normalized value based on weighing the validation results from disparate qualifier systems, as discussed in greater detail below.

The assessment provided by the system to the requester may include, in lieu of the homogenous assessment, clear messages that suggest a course of action to the requester.

The preferred method for passing information from a request servicer 28 to a qualifier system, or between multiple request servicers, is by using sequences of ASCII text representations of triplets (<parameter/action name>; <parameter type>; <parameter value>), with separators within the sequence. The parameter names and types are standardized so as to provide a common network protocol. It will be appreciated that other types of homogenous methods of communication well known in the art can be used, including Extended Markup Language—XML or Standard Generalized Markup Language SGML, as well as other type of tagged markup languages with its specific grammar and syntax. In particular, those markup language which allow are able to provide access to or distribute a syntax are most preferred.

In alternative embodiments, a service requester may communicate with remote qualifier systems by executing remote database queries and inserting the replies into fields of a database record. Homogenous database languages such as SQL can be used for this purpose.

For example, FIG. 3 shows a payment validation request 60 initiated by a bank teller, when a bank's customer deposits a check. The request 60 comprises transaction information created at the time of initiating the request, and includes payment data 62, including, optionally, the image of the check; transaction data 64; identification data 66; and additional control information 68 such as transaction ID and message integrity codes. (Note that this example is premised on the presentment of a conventional check that has no unique or proprietary security data to be forwarded to the validation cell.) The request 60 also preferably includes a tag 67 that signifies the level of service required, as discussed in greater detail below.

The payment validation request can grow dynamically with additional tags and elements, and can supply all information necessary for any type of qualifier system to perform its operations and supply its unique validation results. By using a tagged method of communication such as XML, the preferred embodiment homogenizes communication with heterogeneous qualifying systems. In addition, it will be appreciated that by using this form of communication the service requester 28 does not need to "know" in advance the capabilities of the qualifier system since each one can select only the data that it needs to conduct a validation. Furthermore, by using the same protocol to communicate validation results, the nature of the qualifier systems can dynamically change since the tagged format enables the service requester to interpret varying data in the validation results.

Figure 4A:
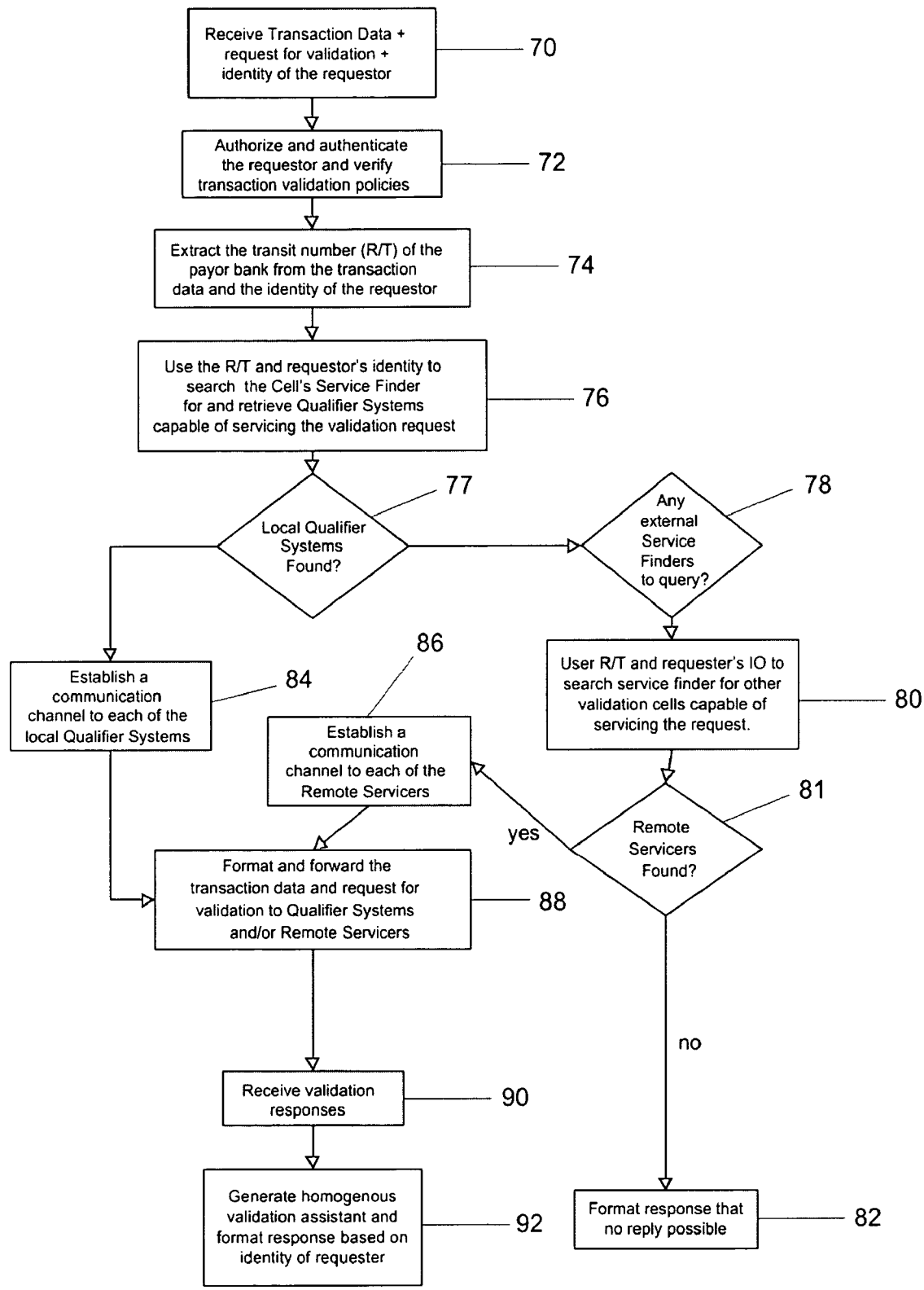
FIG. 4A is a flowchart diagram illustrating steps carried out by the validation cell in processing a payment validation request.

FIG. 4A describes the processing algorithms incorporated into the request servicer 28 in greater detail based on the payment validation request 60 shown in FIG. 3.

At an initial step 70, the request servicer 28 receives the payment validation request 60 from an I/O source 24 preferably capable of formatting and providing information in the common network protocol. In this example, the source is a bank teller terminal which has an automated check reader, as known in the art, or via manual input. At step 72, the request servicer authenticates and authorizes the requester and the information submitted, and then verifies the action against a pre-determined validator group policy and server policies. If the policies are active, and the request has been authorized and authenticated, then at step 74 the request servicer selects the validation search parameters from the transaction data set, e.g., the R/T number, and uses these parameters at step 76 to identify from the local service finder a list of all local qualifier systems, if any, that are capable of validating the transaction or otherwise provide pertinent information about the transaction.

Referring to the example in FIG. 3, the drawee R/T: "123456789" can be used as selected validation search parameters to locate a list of qualifier systems. As previously discussed, a qualifier system can be a core banking system which can determine if the payor's account is open or closed, and if, at the time of the query, sufficient funds exist in the account, or a computer system running a risk scoring algorithm, a printed check database system, or a positive pay database.

At steps 77 and 78 the request servicer 28 determines if user policies allow it to forward a payment validation request to remote qualifier systems, for example, if no local qualifier systems are capable of processing the transaction. At step 80, the R/T number and user's identity is used to search for these other cells. This example employs a connection oriented technique as discussed in which the database 50 stores information on the scope of all other cells.

If the remote service finder returns an empty list and there are no local qualifier systems, then the validation response indicates at steps 82 that the request 60 cannot be serviced.

Alternatively, at steps 84 and 86 the request servicer will establish a communication session to each of the identified local qualifier systems and/or to each remote request servicer returned by the local service finder (which has a network wide registry). At step 88, the service requester multiplexes, formats and sends the transaction data in a payment validation request.

After the local and remote qualifier systems have finished processing the transaction data, then at step 90 the request servicer will receive validation results in one or more responses to the payment validation request. Parameters included in the response will be the ability/inability to have processed the request, the identification, version, type of validation (precise or risk based), and, if desired, a normalized score of the validation result of the system supplying the result, in addition to transaction identification and message integrity code.

For example, where the qualifier system is a core banking system, the validation result could include the identification, version, character of the validation result, e.g., "precise", and a list of attributes, such as:

```
...
    <Identification>
        <value>"ABC Core Processing System"</value>
    </Identification>
    <Version>
        <value>"1.2.3"</value>
    </Version>
    <Precise Validation Capability>
        <value>"yes"</value>
    </Precise Validation Capability>
    <Attributes>
        <Account Status>
            <value>"closed"</value>
        </Account Status>
        <Sufficient Funds>
            <value>"no"</value>
        </Sufficient Funds>
        <Stop Payment>
            <value>"Yes"</value>
        </Stop Payment>
    </Attributes>
...
(and others)
```

In the case of a response received from a remote request servicer, the validation response could include the following information:

```
...
<Identification>
    <value>"ABC Bank - Transaction Validation System"</value>
</Identification>
<Version>
    <value>"1.0"</value>
</Version>
<Precise Validation Capability>
    <value>"yes"</value>
</Precise Validation Capability>
<Risk Based Validation Capability>
    <value>"yes"</value>
</Risk Based Validation Capability>
<Attributes>
<Transaction Validity>
    <value><i4>20%</i4></value>
</Transaction Validity>
</Attributes
...>
```

At step 92, the request servicer combines the transaction validation results received from the local qualifier systems and external request servicer(s), preferably by applying a scoring algorithm to the combination of attributes and data sets received so as to create a homogenous validation assessment formatted in accordance with the profile of the original requestor, which in this example is a bank teller. The preferred method for deriving the homogeneous validation assessment is to employ a scoring algorithm that takes into account the parameters returned by each disparate qualifier system. Alternative embodiments can use a neural network engine or other fuzzy logic engines to process the returned attributes and derive a normalized value which can then be included in a validation result message formatted in accordance with the profile of the requestor.

The preferred scoring algorithm for determining the homogenous validation result takes into account two categories of information: (i) the probability of an item being properly issued, and (ii) the probability of an item being cleared by the payor bank. The algorithm also takes into account absence of information as a method of eliminating uncertainty. It will be appreciated that the preferred embodiment does not disclose detailed test results to the I/O source, in order to prevent "brute force" attacks, i.e. disclosure of defense systems and repeat attempts to "create" a good transaction based on specific results returned for each test. In other words, hackers should not be able to use the system to create the "perfect" fraudulent check.

More specifically, as previously noted the qualifier systems that provide validation results are disparate systems that provide independent analysis. Consequently, the vector of validation results obtained from all responding qualifier systems can be interpreted as defining an N-dimensional space, with each test or type of analysis defining one dimension as a linearly independent event. Each test corresponds to or can be represented as a tag as described previously. For the core banking system example described above, the tags are included in the <Attributes> section and they are <Account Status>, <Sufficient Funds>, and <Stop Payment>, thus yielding three-dimensions.

Validation results can be classified in two categories: one being the probability for the item to be properly issued, the other representing the likelihood or probability for the item to clear. Each class can be considered as a separate universe or N-dimensional space. The objective of the scoring algorithm is to reduce each N-dimensional space (of each category) to one representative number, thereby combining the validation results in that universe.

One method of "folding" an N dimensional space into one measurement is calculating the "volume" of the geometric object defined by the N dimensions. Since each type of test found in validation responses represents one of the dimensions in the N-dimensional space, the measurement of the combined answer is therefore the mathematical integral of the N dimensions.

Figure 4B:
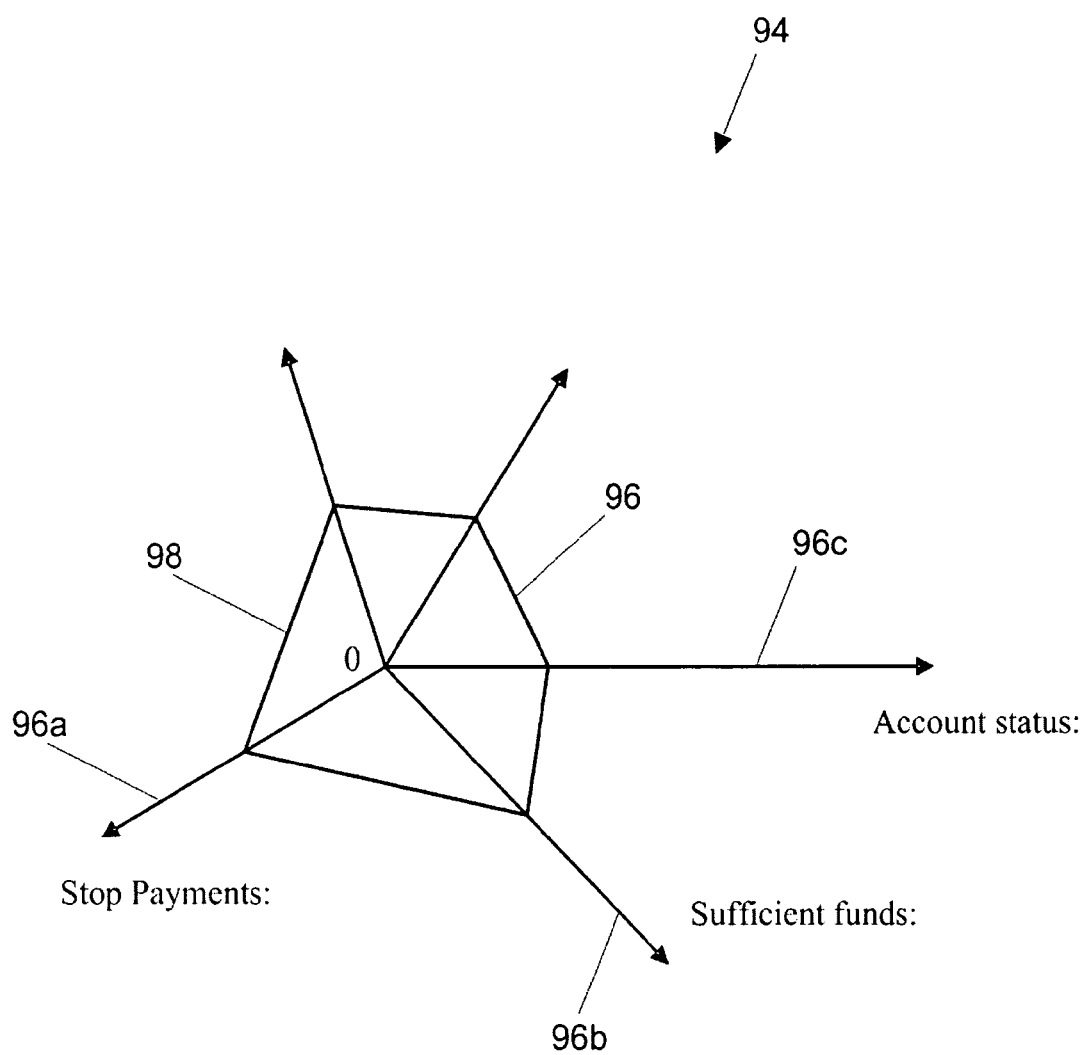
FIG. 4B is a diagram of a geometrical body constructed in N-dimensional space which is used to compute a homogenous validation assessment.

It will be appreciated that more tests represent more dimensions, and the more successful the test, the larger the distance between the origin of the space ("0") and the point of intersection, hence the more tests performed successfully, the larger the volume of the geometrical figure. For example, FIG. 4B shows a five dimensional space 94 comprising three dimensions 96*a*, 96*b*, 96*c* which constitute the core banking system described above plus two other dimensions 96*d* and 96*e* provided by other tests. Collectively, they define a geometric object 98 formed in five dimensions.

The volume of the geometrical object 98 can be calculated by the mathematical integral:

$$\text{Score} = \int_1^N aiXi + bi$$

where:

N represents the number of all tests—identified by each individual distinct tag returned in the validation responses, Xi represents the score of each test, normalized between 0 and 100, as returned by each qualifier system, and 'a' and 'b' represent coefficients associated with the type of validation (precise v. approximate), product versions, and overall capabilities of the responding system.

While the preferred scoring algorithm is based on a "volume" calculation based on mathematical integral, a simplified mathematical model can include a "lookup table" that can be maintained in distributed or centralized form and accessed by each request servicer. Such a local "lookup table" can be maintained locally within the confines of the cell, by each request servicer, with updates from a central database triggered either by time or by the receipt of a validation response from an "unknown" system, or by receiving a tag not previously encountered. This method would be equivalent to pulling information from a central database. Alternatively, a central database could push information to all validation cells registered, and showing appropriate credentials. An example is shown in the table 1 below:

TABLE 1

| System | Version | Tag (test) | Validation Type | Weight (W) in relation to other tests | Maximum score (MS) (for normalizing results) |
|---|---|---|---|---|---|
| ABC Core Processing System | 1.2.3 | <Account Status> | Precise | 45 | 100 |
| | | <Sufficient Funds> | Precise | 45 | 100 |
| | | <Stop Payment> | Precise | 45 | 100 |
| SAND | 2.0 | <Authentic Item> | Precise (includes payee name) | 75 | 100 |
| | | <Authentic Item> | Precise (excludes payee name) | 65 | 100 |
| ... | ... | ... | ... | ... | ... |

Given the above table 1, let $S_i$ represent the score associated with a particular test performed by a qualifying system which has included the test result under the appropriate tag in the validation result. Given the above table that contains the system, version, and type of test, the resulting value, in each of the two categories of results (item properly issued, and probability for the item to clear) could be calculated by the following formula:

$$\text{Score} = e^N \sum_{i=1}^{N} \frac{S_i}{M_i} W_i$$

Having now defined how validation results from disparate qualifier systems can be combined, the service requester can respond to a requesting I/O source using the network protocol. For example, the resulting answer to a payment validation request can be as follows (see also FIG. 9 which exemplifies how the following message can be graphically displayed to the end user):

```
<Transaction>
    <value>"Transaction number to which this answer applies"</value>
</Transaction>
<Level of service requested>
    <value>"Gold"</value>
</Level of service requested>
<Level of service provided>
    <value>"Gold"</value>
</Level of service provided>
<Properly Issued Item>
    <value>"90/%"</value>
</Properly issued item>
<Likelihood for the check to clear>
    <value>"80%"</value>
</Likelihood for the check to clear>
```

It will be understood from the foregoing that each cell can function a fee-based transaction validation service provided by any financial institution, check authorization system or check issuer. For this purpose, each cell preferably maintains a log of all validations performed, including the points of origination, validation results, transaction data, and other information relevant to the transaction and the result such as date and time, location, and a list of the local and remote qualifier systems that participated in validating the transaction. The log can be made available for billing, or for creating management reports.

In the preferred embodiment, the service requester maintains a billing plan (in profile 46) for each requester entity. The billing plan can be based on a flat fee structure or on a per transaction basis. Each such plan defines the minimum and/or maximum quality of service demanded by the requester entity.

Quality of service is dependent, in part, on the number of qualifier systems participating in a transaction validation, since more information from more sources will generally yield a better-qualified answer of whether a check is valid. Quality of service can also take into account the type and amount of information provided. For example, a determinative or precise transaction validation (e.g., involving account status, availability of funds, stop payment, authenticity of the item, etc.) is of a better quality than a statistical analysis of the transaction, based on patterns or rules. However, a combination thereof will therefore yield a better quality of service, with more information, of better quality, available to draw a conclusion of whether or not a transaction is valid.

Quality of service (QOS) is preferably implemented by a series of rules that may be specific to each user or user organization. QOS is preferably homogeneously described in terms of a "level", e.g., bronze, silver, and gold, each of which triggers one or more associated sets of rules that are executed by the service requester to determine if the requested quality of service is met. For example, the following rules can be triggered by the originating request servicer for three different QOS levels:

Bronze: Payor Account Status is open and has sufficient funds

Silver: Bronze+signature verification system >30%

Gold: Silver+positive result obtained from positive pay qualifier system or SAND™ system FIG. 5 details various I/O sources that can be utilized by the system 18 and shows one particularly preferred embodiment of a validation network 100.

In the event the requester is a check capture and processing center of a bank, the I/O source is preferably a computer program 102 capable of selecting an "All Items File" produced at the time of check capture, or an ACH/EFT posting file containing electronic transaction data. Similarly, the I/O source in the case of an electronic merchant can be an ACH or EFT file.

Figure 5:
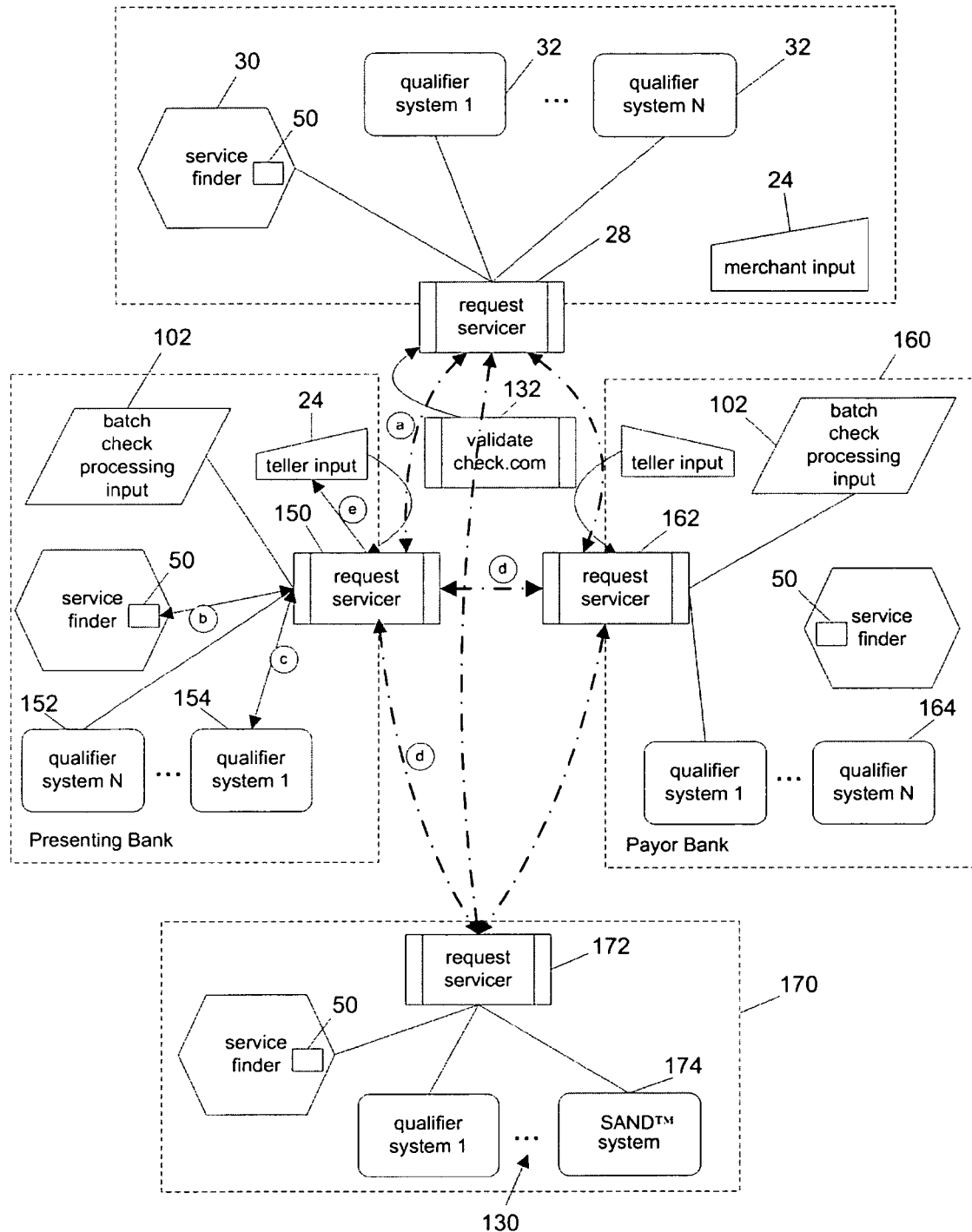
FIG. 5 is a schematic diagram of the preferred embodiment of the payment validation network, which incorporates a web site as a gateway to the network.
Figure 6A:
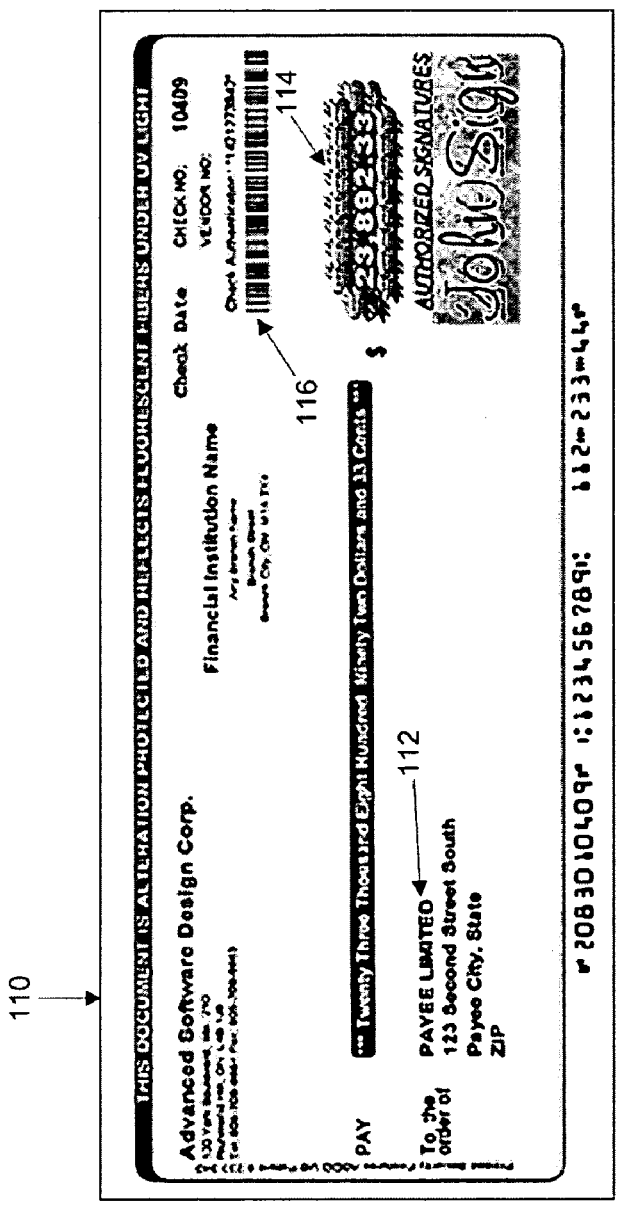
FIGS. 6A and 6B are diagrams of checks which employ encryption codes in accordance with the SAND™ security system, discussed in greater detail below.
Figure 6B:
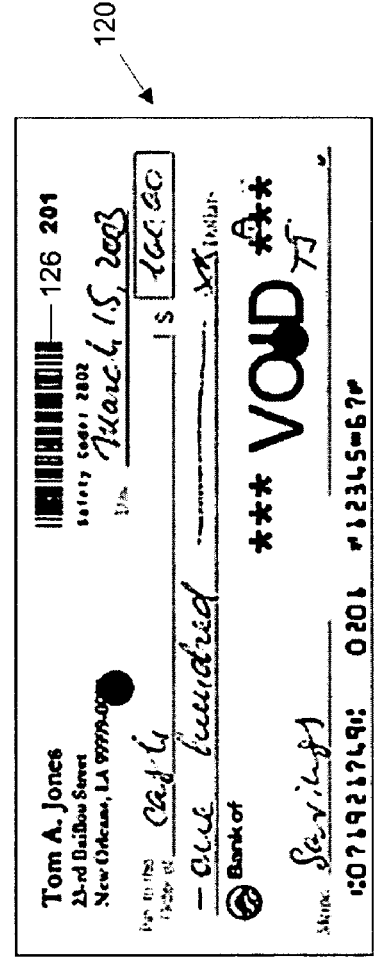

FIG. 5 also shows one of the I/O sources as front end of a check validation system 130 which employs the SAND™ architecture (provided by Advanced Software Design Corporation of Richmond Hill, ON) for enhancing the security of checks. In this scheme, an encryption code which represents encrypted information is printed on the check, using a bar code, magnetic-readable characters, or in clear. The SAND™ system provides various levels of security depending on the specific information encrypted. For example, FIG. 6A shows a check 110 printed by an associated check printing subsystem which encapsulates both the payee 112 and the amount 114 of the check, in addition to other payment data, into authentication code 116. In contrast, a portion of the payment data in check 120 shown in FIG. 6B is manually entered, and so the authentication code 126 encapsulates a more limited set of information. The check 110 provides a higher degree of security than the check 120.

Figure 5A:
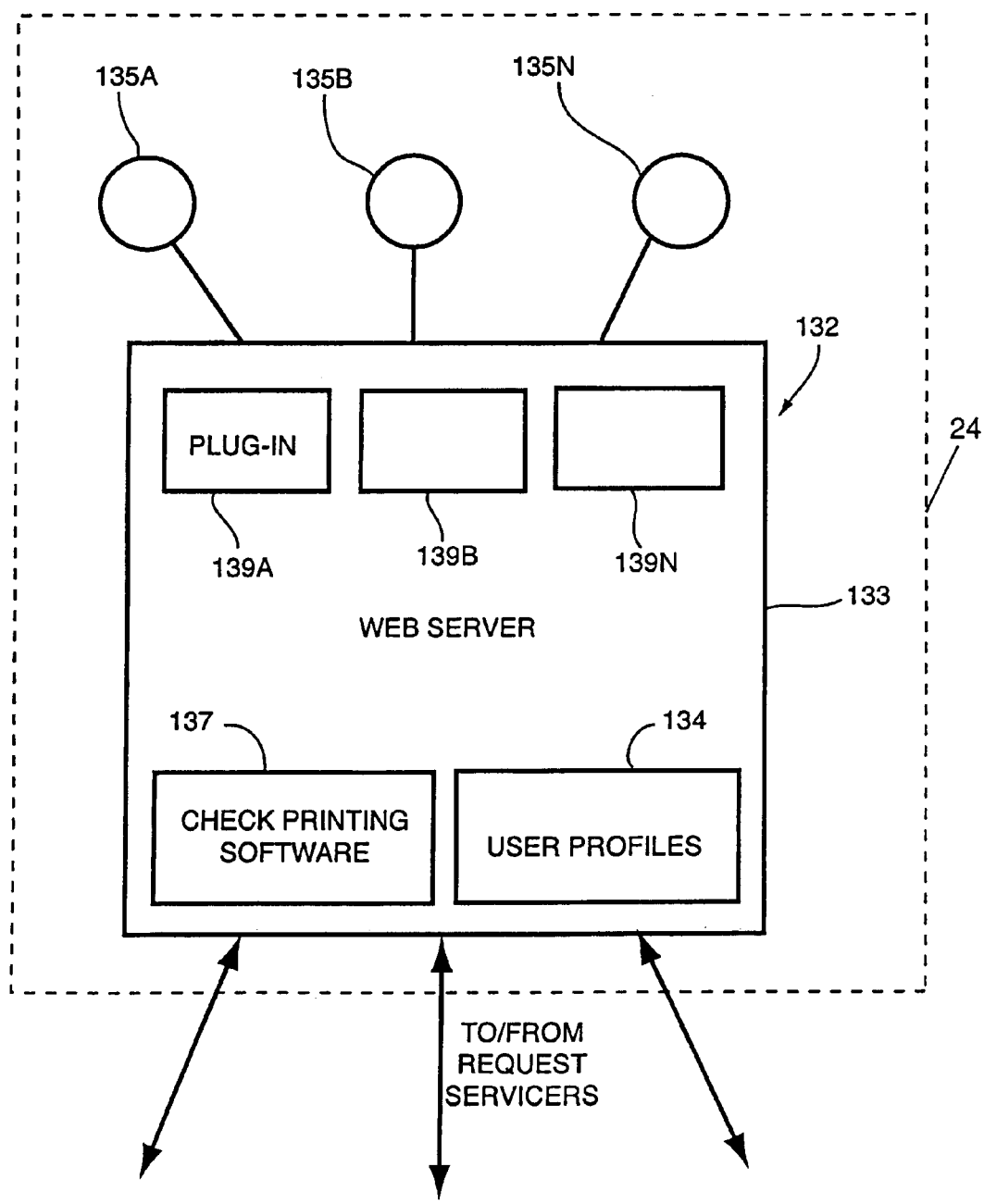
FIG. 5A is a schematic diagram of various software components of a web server which provides the web site shown in FIG. 5.

In one implementation of the system 130, each check has a printed direction on it indicating an Internet web site 132 where the check can be authenticated, e.g., ValidateCheck.com. This website 132 maintains a profile for each user of the service. More particularly, the web site 132 functions as a portal or gateway where merchants, tellers, check cashing stores, banks' data processing centers and other outlets that accept checks can establish an account for validating checks that they accept as part of a financial transaction. As seen in FIG. 5A, the web site 132 includes a web server 133 that is capable of accepting validation requests from a variety of I/O devices 135A, 135B, . . . 135N in a variety of formats (the web server and I/O devices being collectively an I/O source 24). The web server 133 is preferably able to accept requests for check validation in a number of formats, including: (i) manually entered transaction data; (ii) partially manually entered transaction data and partially electronically captured transaction data; and (iii) check image capture, which is sent as part of a payment validation request. The web server 133 preferably also provides the following functions:

Enables end users to download check printing software 137 that enables them to print an encryption barcode on checks. This allows customers of banks that have not implemented SAND™ to enroll in the program and allows third parties to validate checks written by these customers. A user profile is created for each registered user.

Enables smaller community banks to outsource the SAND™ program by sending a file of encrypted checks to be validated by the SAND™ qualifier system. In this case, the bank's customers can enroll directly in the program, as above, in which case a user profile is created for each such registered user. (In addition, web server enables the paying bank to send a list of items for validation and the results are sent back to the bank. In this case, the web server provides an interface or plug-in 139—such as a Java™ applet or ActiveX™ control to a check capture device 135 used by the bank, and the web server converts the data from the native format of the I/O device into the common network protocol.)

Enable merchants, tellers at the bank of first deposit, and check cashing stores to enter the information of the check they are accepting using a variety of I/O devices 135, and submit a request for verification. A user profile is established for each user of a registered organization.

Figure 7:
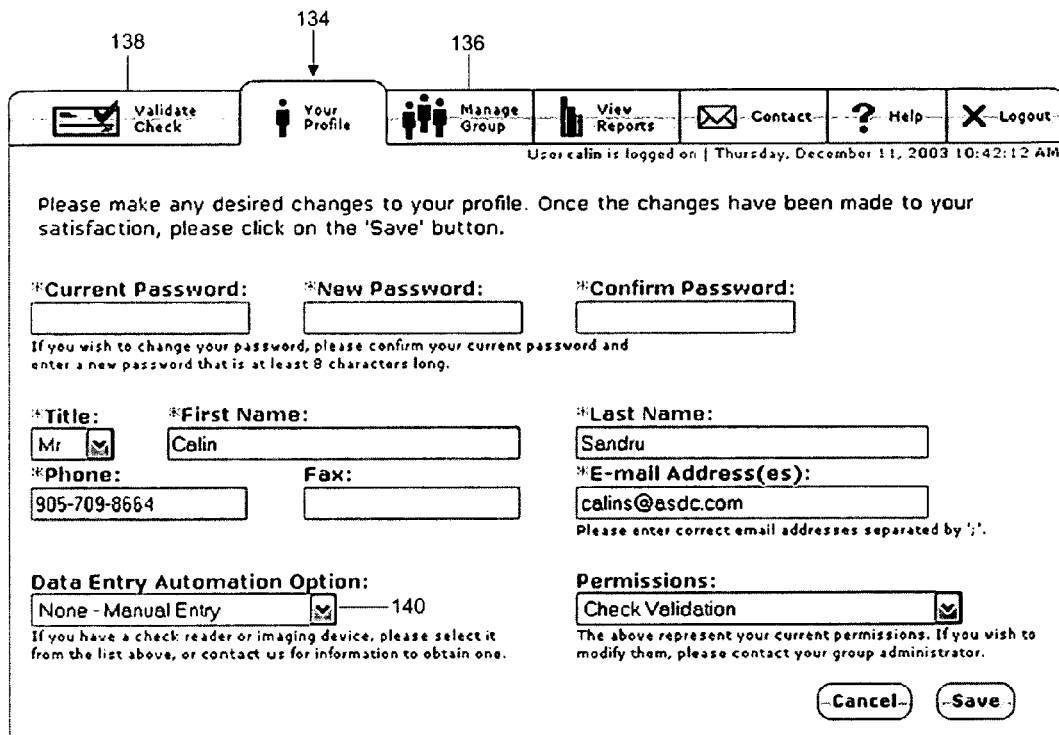
Figure 8:
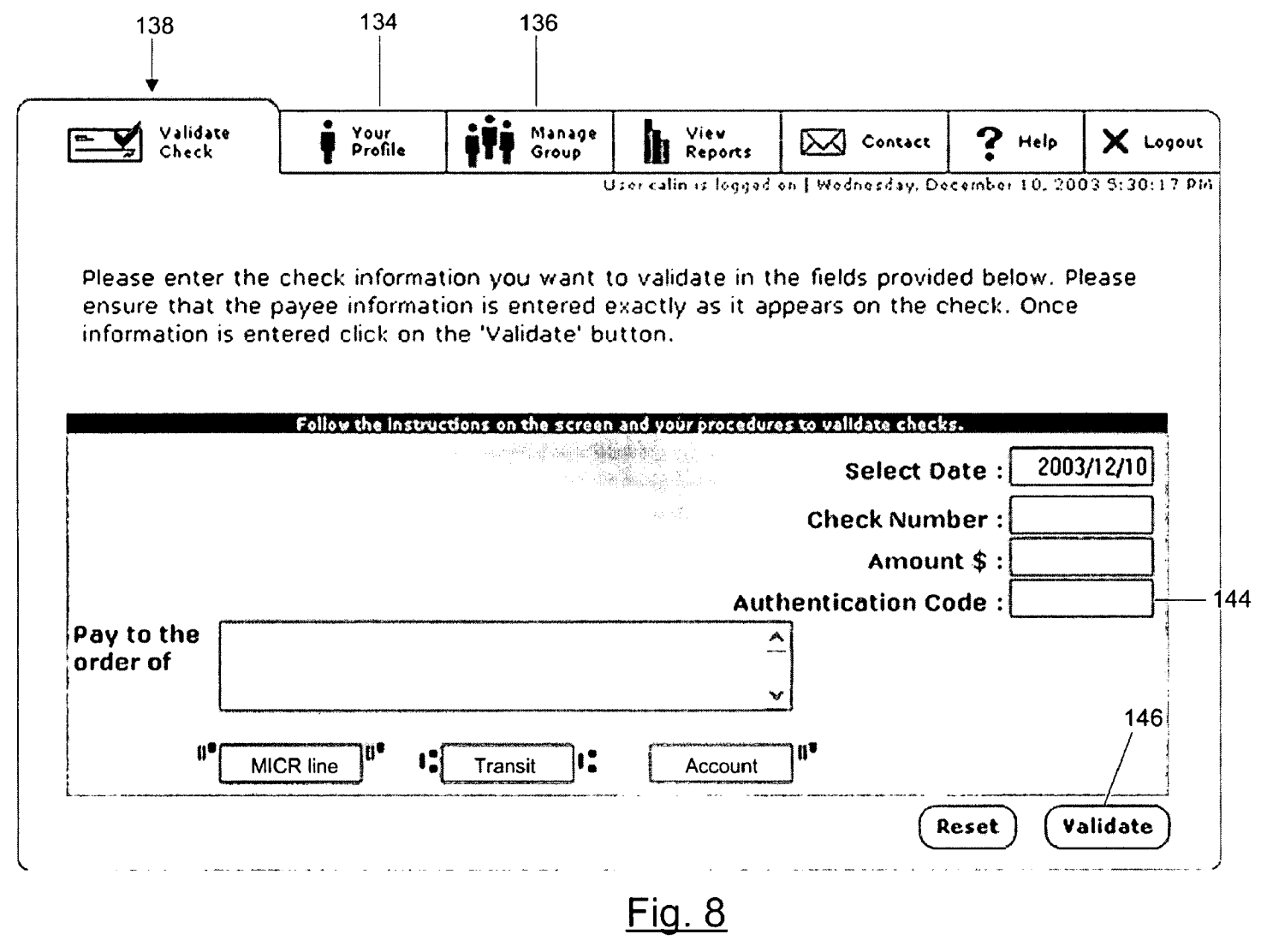

An example of a user profile 134 for a bank teller who is part of a larger group 136 is shown in FIG. 7. Although not specifically shown in FIG. 7, one of the group settings is a level of service required for validating checks (see more, particularly FIG. 9). When the teller receives a check for deposit he or she can validate the check at a user input page 138 of the website 132, shown in FIG. 8. In this particular example, because the data entry profile 140 (FIG. 7) was set to "manual input", the teller manually inputs the payment data into the fields on input page 138. The authentication field 144 (FIG. 8) is used to capture the authentication codes on the SAND™ checks. Note, however, that the web site 132 may be used to validate conventional checks in which case field 144 may be left blank. Once the data is entered the teller can actuate the validate control 146.

FIG. 5 schematically illustrates the processing steps (labeled alphabetically) that occur throughout the validation network 100:

(a) After the teller fills in web form 138, the web sever 133 formats the transaction data into the common network protocol and forwards it to a local request servicer, in this case, request servicer 150 associated with the presenting bank. (The user profile 134 associates each registered user with a request servicer. In the instant case, because the teller is associated with a large organization, request servicer 150 is dedicated to this organization. As a default, however, the web server 133 forwards payment validation requests to cell 170 which incorporates a SAND™ qualifier system 174.)

(b) The request servicer 150 queries the local service provider 152 as to which qualifier system is capable of processing the payment validation request. In the instant example, the service finder 152 returns local qualifier system 154 which is a core banking system that provides information about the depositor's bank account. The service provider 152 also queries master database 50 which indicates that the particular check used in this example can be additionally validated by cell 160, which is associated with the payor bank, and cell 170, which is associated with the SAND™ system. The quality of service profile for the teller's group indicates that validation is required by all other remote qualifier systems, where possible.

(c) The request servicer 150 sends a payment validation request to the local qualifier system 154 which returns a validation result in response.

(d) The request servicer 150 sends a network-formatted payment validation request to the request servicers 162 and 172 of cells 160 and 170. These request servicers, in turn, send payment validation requests to local qualifier systems 164 and 174 which provide validation results about the payor's account status and the authenticity of the check, respectively. The corresponding request servicers transmit network-formatted validation results back to the originating request servicer 150. Note that the qualifier system 174 which provides the SAND™ system will provide different validation results back depending on the level of security inherent in the check. For example, results associated with check 110 are reported with a high degree of confidence whereas results reported in connection with check 20 are reported back with a lower degree of confidence.

Figure 9:
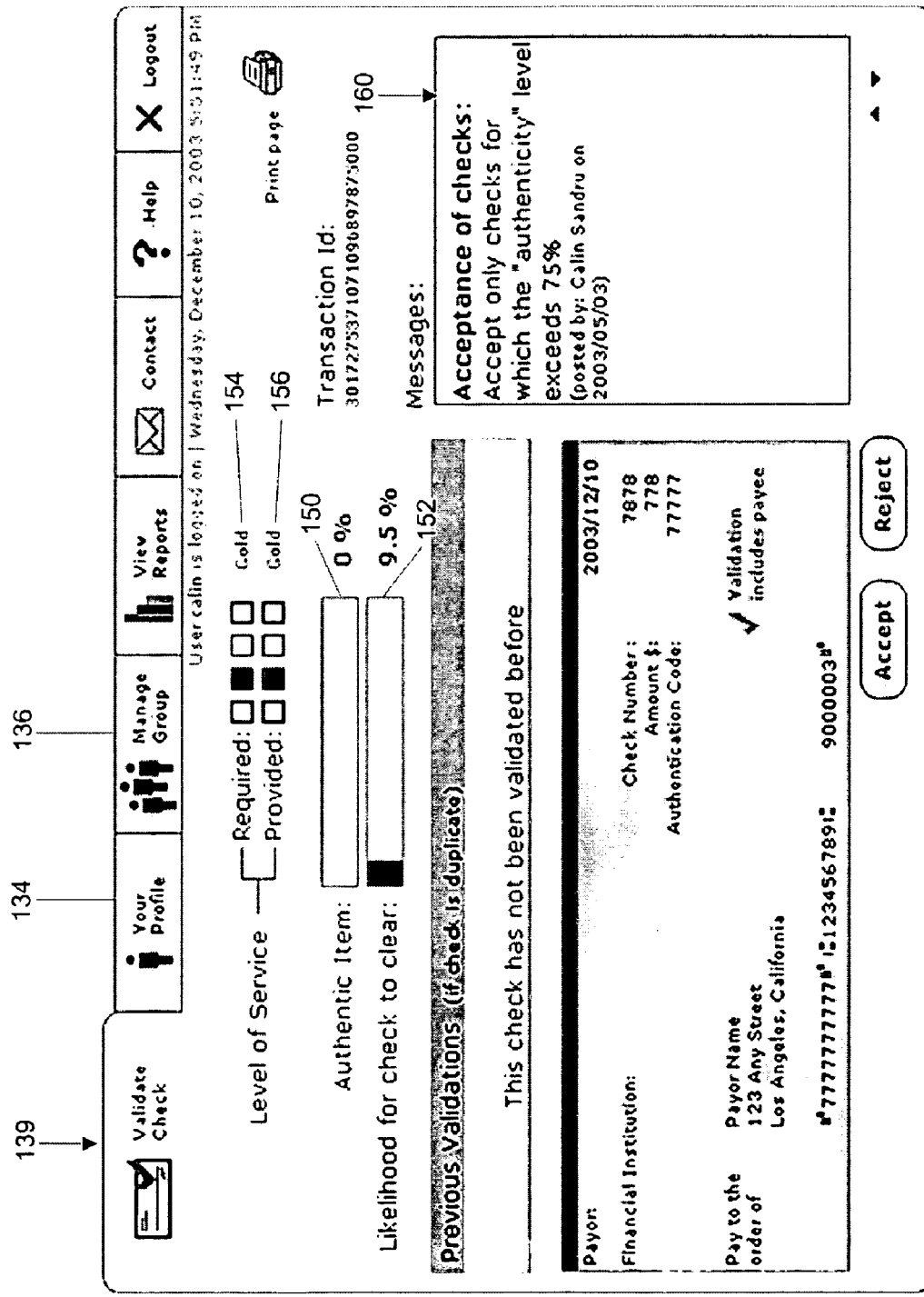

(e) The request servicer 150 processes the validation results and sends a homogenous validation result to the web site 132, which functions as a multiplexed I/O source for this particular transaction. FIG. 9 shows an example of a response web page 139 viewed by the teller. As will be seen, the homogenous validation result is displayed as the probability 150 that the presented check is properly issued and a probability 152 that the check will clear the settlement process. In addition, the quality of service level established for the teller (154) and quality of service provided by the system (156) is also displayed. The user interface also includes a message area 160 for delivering messages pertaining to the user's profile—in this case the fact that the presenting bank's policy for this teller is that he or she may only accept checks that have a probability of being properly issued that is greater than 75%.

The preferred embodiment is intended to provide real time check validation at the point of presentment and so the payment validation request is preferably dispatched to the qualifier systems as part of one transaction (which may be distributed in nature). If desired, time limits can be established for receiving responses from each of the qualifier systems to set a maximum time for delivering a reply to the I/O source. It will also be understood that the preferred embodiment does not replace the national check clearing and settlement system, but rather seeks to draw out as much information as possible in advance of the check clearance process to ensure that all transactions that enter the settlement process are valid and have a high chance of clearing, thereby minimizing any returned transactions and reducing the rather high costs associated therewith.

In the preferred embodiment, the qualifier systems and/or the request servicers which function as proxies therefor via the translators preferably provide any validation results back to the initiator of the request in a homogenous manner using the network protocol. It will be appreciated that the network protocol enables validation results to be passed from the qualifier systems to the request servicer without the need for disseminating private data, which remains the property of the qualifier system. Thus, for example, a bank need not disclose account balance to a third party to make a decision if a transaction has sufficient funds to clear, but rather the bank will make that determination and reply with a more generic answer as to the sufficiency of funds. Accordingly, information necessary to validate a transaction can remain encapsulated, kept and managed by the entity which owns that information in the first instance. For example, a bank can retain management of account status and availability of funds; and a merchant can retain its positive and negative transaction history database. The preferred embodiment eliminates the need for such entities to send confidential information to a centralized system or share the detailed data with others. This is a significant advantage because, for example, the payor bank will not need to change its processing of credits and debits applied to an account or require a method to dispatch and maintain account information into a centralized location and a number of other places; can easily apply all transactions against the account; and can easily roll-back transactions in case of reversed transactions.

The preferred embodiment has described the validation cells with a particular structure, but it should be understood that other structures may be employed in the alternative. A cell includes logic for at least propagating a payment validation request to another cell, which includes a replicate of that logic. Thus, for instance, the qualifier systems can be considered as cells if they have the capability to forward payment validation requests to other qualifier systems which have the same characteristic. Preferably, each cell also includes a logic for formatting payment validation requests and/or results to a common network protocol so as to allow for interoperability amongst disparate qualifier systems. Those skilled in the art will appreciate that a variety of modification can be made to the embodiments disclosed herein without departing from the spirit of the invention.

The invention claimed is:

1. A check validation system, comprising: a network of validation cells, each said cell being associated with at least one local qualifier system for assessing risk of loss in accepting a check; and an input/output (I/O) source operatively connected to at least one cell for obtaining transaction data associated with a check at a point of presentment; wherein a given validation cell that is operatively connected to a requesting I/O source receives transaction data therefrom in connection with a given check and forwards a payment validation request to at least one other cell without foreknowledge of validation capabilities or native data format of said at least one other cell, said request for obtaining at least one validation result from at least one remote qualifier system associated with the at least one other cell; and wherein the given cell transmits at least one validation assessment back to the requested I/O source based on the at least one validation result.

2. A system according to claim 1, wherein a given validation cell forwards a payment validation request to one or more qualifier systems respective to said given validation cell based on routing/transit (RIT) information included in the transaction data.

3. A system according to claim 1, wherein the given cell forwards the payment validation request to other veils in the event the local qualifier systems do not cover a Routing/Transit ("R/T") number of the check.

4. A system according to claim 1 wherein said at least one remote qualifier system includes at least one of a core banking system characterizing account statuses; a merchant check authorization system; an issued items database system; a check printing system; a risk-based statistical modeling system; a check authentication system based on encryption; a signature verification system; a visual analysis system; a credit authorization system.

5. A system according to claim 1, wherein the requesting I/O source formats the payment validation request according to a common network protocol based on said transaction data, prior to sending the payment validation request to the corresponding cell.

6. A system according to claim 5, wherein: a plurality of the qualifier systems employ disparate methods for assessing the risk of loss in accepting a check and each of said plurality provides a homogeneous validation assessment.

7. A system according to claim 5, wherein each of the qualifier systems format validation results according to a common network protocol for distribution to other cells.

8. A system according to claim 1, wherein the given cell formats the payment validation request according to a common network protocol based on said transaction data, prior to sending the payment validation request to the at least one other cell.

9. A system according to claim 8, wherein: a plurality of the qualifier systems employ disparate methods for assessing the risk of loss in accepting a check; and the given cell receives validation results from a plurality of disparate qualifier systems and processes said results to provide a homogeneous validation assessment to the requesting I/O source.

10. A system according to claim 9, wherein validation results forwarded to other cells are formatted according to a common network protocol.

11. A system according to claim 9, wherein the homogeneous validation assessment is expressed as: (i) the likelihood that the check is properly issued and (ii) the likelihood of the check clearing.

12. A system according to claim 11, wherein the given cell maintains user profiles for determining if a payment validation request received from the requesting I/O device should be forwarded to other cells for obtaining validation results therefrom.

13. A system according to claim 12, wherein said user profile includes a quality of service indicator, and the given cell forwards a payment validation request associated with a specified user to at least one other cell if the local qualifier systems do not provide the quality of service indicated for the specified user.

14. A system according to claim 12, wherein the given cell advertises the payment validation request and the associated quality of service required so that the qualifier systems can bid for the right to provide validation results.

15. A check validation system, comprising: a network of validation cells, each said cell being associated with at least one local qualifier system for assessing risk of loss in accepting a check; and an input/output (I/O) source operatively connected to at least one cell for obtaining transaction data associated with a check at a point of presentment; wherein each validation cell is enabled to receive a payment validation request from an I/O source or an originating cell and forward said request to at least one other cell without foreknowledge of capabilities or native data format of said at least one other cell, said request for obtaining at least one validation result from at least one remote qualifier system and thereafter transmit at least one validation result back to the I/O source or originating cell.

16. A check validation system, comprising: a network of validation cells, each said cell having at least one qualifier system for assessing at least one of (i) the proper issuance of checks and (ii) the likelihood of checks clearing; an input/output (I/O) source connected to at least one cell for obtaining transaction data associated with the check at a point of presentment, including transit/routing information; and service finder means, accessible by each cell, for associating transit/routing codes with one or more qualifier systems capable of assessing the proper issuance or likelihood of clearance of checks bearing the transit/routing codes; wherein a given validation cell is programmed to receive transit/routing information associated with a given check from a requesting I/O source and in response consult the service finder means, format a payment validation request according to a common network protocol based on the transaction data, and forward said request to one or more other validation cells without foreknowledge of validation capabilities or native data format of said at least one other cell, said request for processing based on the transit/routing number; the given cell receiving one or more assessments of proper issuance or clearance from the other cells and reporting a homogenous validation assessment to the requesting I/O source.

17. A check validation system, comprising: a plurality of qualifier systems which employ disparate methods for assessing risk of loss in accepting a check; and a request servicer for communicating with at least one input/output I/O source and obtaining transaction data associated with the check at a point of presentment and for communicating a check payment validation request from the at least one I/O source to at least two of the disparate qualifier systems, wherein either said at least one I/O source or the service requester formats the check payment request according to a common network protocol; and wherein the service requester is programmed to receive a validation result from each of the disparate qualifier systems and process said results to provide a combined validation result to the requesting I/O source.

18. A system according to claim 17, wherein the combined validation result is a homogeneous validation assessment is expressed in two dimensions as: (i) the likelihood that the check is properly issued, and (ii) the likelihood of the check clearing.

19. A system according to claim 18, wherein each said dimension is expressed as a probability.

20. A system according to claim 18, wherein at least one of the qualifier systems is a deterministic system and at least one of the qualifiers is a non-deterministic system.

21. A check validation cell, comprising: a plurality of qualifier systems for assessing risk of loss in accepting a check; a service finder for identifying a scope of coverage provided by each of the qualifier systems; a plurality of input/output (I/O) sources for obtaining transaction data associated with a check at a point of presentment; a request servicer interfacing with the I/O sources, service finder and the qualifier systems in order to (i) receive transaction data from an I/O source in connection with the check, including the routing/transit number, (ii) consult the service finder to identify which qualifier system covers the check, (iii) transmit a payment validation request to the identified qualifier systems, (iv) receive one or more validation results from identified qualifier systems, and (v) process said results to provide a homogeneous validation assessment to the requesting I/O source.

22. A cell according to claim 21, wherein the qualifier systems employ disparate methods, including determinate and non-determinative methods, for assessing the risk of loss.

23. A system according to claim 21 wherein said local qualifier system includes at least one of; a core banking system characterizing account statuses; a merchant check authorization system; an issued items database system; a check printing system; a risk-based statistical modeling system; a check authentication system based on encryption; a signature verification system; a visual analysis system; a credit authorization system.

24. A network of check validation cells, each said cell comprising: a plurality of local qualifier systems for assessing risk of loss in accepting a check; a service finder for identifying a scope of coverage provided by each of the local qualifier systems and for identifying at least some other cells; a plurality of input/output I/O sources for obtaining transaction data associated with a check at a point of presentment; a request servicer interfacing with the I/O sources, service finder and the qualifier systems in order to (i) receive transaction data from an I/O source in connection with the check, including the routing/transit number, (ii) maintain a user profile for the I/O source, (iii) consult the service finder to identify which local qualifier systems cover the R/T number associated with the check, (iv) transmit a payment validation request to the identified local qualifier systems and at least one other remote request servicer in accordance with the user profile, (v) receive one or more validation results from local qualifier systems or remote request servicers, and (vi) process said results to provide a homogeneous validation assessment to the requesting I/O source.

25. A system according to claim 24 wherein said at least one local or remote qualifier system includes at least one of; a core banking system characterizing account statuses; a merchant check authorization system; an issued items database system; a check printing system; a risk-based statistical modeling system; a check authentication system based on encryption; a signature verification system; a visual analysis system; a credit authorization system.

26. A system according to claim 24, wherein said request servicer formats the payment validation request according to a common network protocol based on said transaction data, prior to sending the payment validation request to remote request servicers.

27. A system according to claim 26, wherein a plurality of the qualifier systems employ disparate methods for assessing the risk of loss in accepting a check and said request servicer receives validation results from a plurality of disparate qualifier systems.

28. A system according to claim 27, wherein validation results forwarded to other cells are formatted according to a common network protocol.

29. A system according to claim 28, wherein the homogeneous validation assessment is expressed as: (i) the likelihood that the check is properly issued and (ii) the likelihood of the check clearing.

* * * * *